US007744457B2

(12) United States Patent
Gauselmann

(10) Patent No.: US 7,744,457 B2
(45) Date of Patent: Jun. 29, 2010

(54) GAMING MACHINE DISPLAYING SPECIAL SYMBOLS THAT SHIFT POSITIONS

(75) Inventor: Michael Gauselmann, Espelkamp (DE)

(73) Assignee: Atronic International GmbH, Lübbecke (DE)

(*) Notice: Subject to any disclaimer, the term of this patent is extended or adjusted under 35 U.S.C. 154(b) by 1051 days.

(21) Appl. No.: 10/763,836

(22) Filed: Jan. 22, 2004

(65) Prior Publication Data

US 2005/0164774 A1 Jul. 28, 2005

(51) Int. Cl.
*A63F 9/24* (2006.01)
*A63F 13/00* (2006.01)

(52) U.S. Cl. ............................ 463/20; 463/16; 463/17; 463/25; 463/29; 463/42

(58) Field of Classification Search .................. 463/16, 463/20, 21, 25, 30; 273/143 R
See application file for complete search history.

(56) References Cited

U.S. PATENT DOCUMENTS 5,332,219 A * 7/1994 Marnell, II et al. ............ 463/13
5,833,537 A * 11/1998 Barrie ......................... 463/21
5,980,384 A * 11/1999 Barrie ......................... 463/16
6,033,307 A * 3/2000 Vancura ....................... 463/20
6,142,875 A * 11/2000 Kodachi et al. ............... 463/20
6,251,013 B1 6/2001 Bennett
6,270,412 B1 * 8/2001 Crawford et al. .............. 463/20
6,471,208 B2 * 10/2002 Yoseloff et al. ......... 273/143 R
6,517,432 B1 * 2/2003 Jaffe .......................... 463/16
6,561,900 B1 * 5/2003 Baerlocher et al. ............ 463/20
6,676,512 B2 * 1/2004 Fong et al. .................... 463/20
6,855,054 B2 * 2/2005 White et al. .................. 463/21
7,090,580 B2 * 8/2006 Rodgers et al. ............... 463/20
2002/0010018 A1 * 1/2002 Lemay et al. ................ 463/20
2002/0025849 A1 * 2/2002 Olive ......................... 463/29
2002/0160828 A1 * 10/2002 Webb et al. ................. 463/16
2003/0022712 A1 * 1/2003 Locke ......................... 463/20
2004/0048646 A1 * 3/2004 Visocnik ...................... 463/16
2005/0054420 A1 * 3/2005 Cregan et al. ................ 463/20

* cited by examiner

*Primary Examiner*—John M Hotaling, II
*Assistant Examiner*—Ryan Hsu
(74) *Attorney, Agent, or Firm*—Patent Law Group LLP; Brian D. Ogonowsky

(57) ABSTRACT

In a virtual spinning reels type video slot machine, one or more of the possible symbols are special symbols. Examples of special symbols are wild cards and multipliers. If the special symbol cannot be utilized in the current game to grant an award to the player, the special symbol is carried over into the next game. When the player spins the reels for the next game, the special symbol(s) moves (e.g., randomly) to any position in the array as the reels appear to spin. When the reels stop, the special symbol(s) carried over from the previous game is applied to the current game to grant an award to the player. In another embodiment, special symbols are not extinguished after they are used, but may continue for any selected number of games.

27 Claims, 3 Drawing Sheets

| | | | | |
|---|---|---|---|---|
| A | B | C | D | E |
| F | G | H | I | J |
| K | L | ?1 | N | O |

| | | | | |
|---|---|---|---|---|
| A | B | C | D | ?2 |
| F | ?1 | H | I | J |
| K | L | M | N | O |

| | | | | |
|---|---|---|---|---|
| A | ?1 | C | D | E |
| F | G | H | ?2 | J |
| K x3 | L | M | N | O |

| | | | | | |
|---|---|---|---|---|---|
| A | ?1 | C | D | E | |
| F | G | H | ?2 | J | |
| K | L | M | N | O | x3 |

GAMING MACHINE DISPLAYING SPECIAL SYMBOLS THAT SHIFT POSITIONS

FIELD OF THE INVENTION

This invention relates to gaming machines and, in particular, to a special feature in a game played on a video gaming machine.

BACKGROUND

Video gaming machines that randomly select symbols for display on the video screen and grant awards to a player based upon the displayed symbol combinations are very popular. The symbols may form a 3×1 array, having three symbols in a single row, or the display may be a two dimensional array of symbols having, for example, three rows of symbols in five columns. The granting of an award is based on the symbol combinations across pay lines extending across the array of symbols.

Although the above-described gaming machines are popular, it is desirable to create a game that achieves more player excitement to generate more revenue by the gaming machine.

SUMMARY OF THE DISCLOSURE

In one embodiment, a special feature is offered by a spinning reels type video slot machine, where virtual reels displayed on a video screen appear to rotate and are stopped to reveal an array of symbols. Awards are granted to the player based on certain combinations of symbols across a pay line.

One or more of the possible symbols are special symbols. Examples of special symbols are wild cards and multipliers. If the reels stop and display a special symbol, the special symbol is used in conjunction with the conventional symbols to grant an award to the player. If the special symbol cannot be utilized in the current game to grant an award to the player, the special symbol is carried over into the next game. When the player spins the reels for the next game, the special symbol(s) randomly moves to any position in the array as the reels appear to spin. When the reels stop, the special symbol(s) carried over from the previous game is applied to the current game to grant an award to the player. In another embodiment, the special symbols move in other than a random manner.

If the special symbol is a wild card, that special symbol acts as any symbol. If the special symbol is a multiplier, that special symbol multiplies the award along the pay line containing the special symbol. The multiplier can be superimposed over any other symbol, or can by placed in the corner of a symbol position, or can be placed at an end of a pay line.

Many different special symbols can be used in the same game. In one embodiment, up to eight special symbols can be carried over to a next game and randomly moved between games.

In another embodiment, special symbols are not extinguished after they are used, but may continue for any selected number of games.

DETAILED DESCRIPTION

Although the invention can typically be implemented by installing a software program in most types of modern video gaming machines, one particular gaming machine platform will be described in detail.

Figure 1:
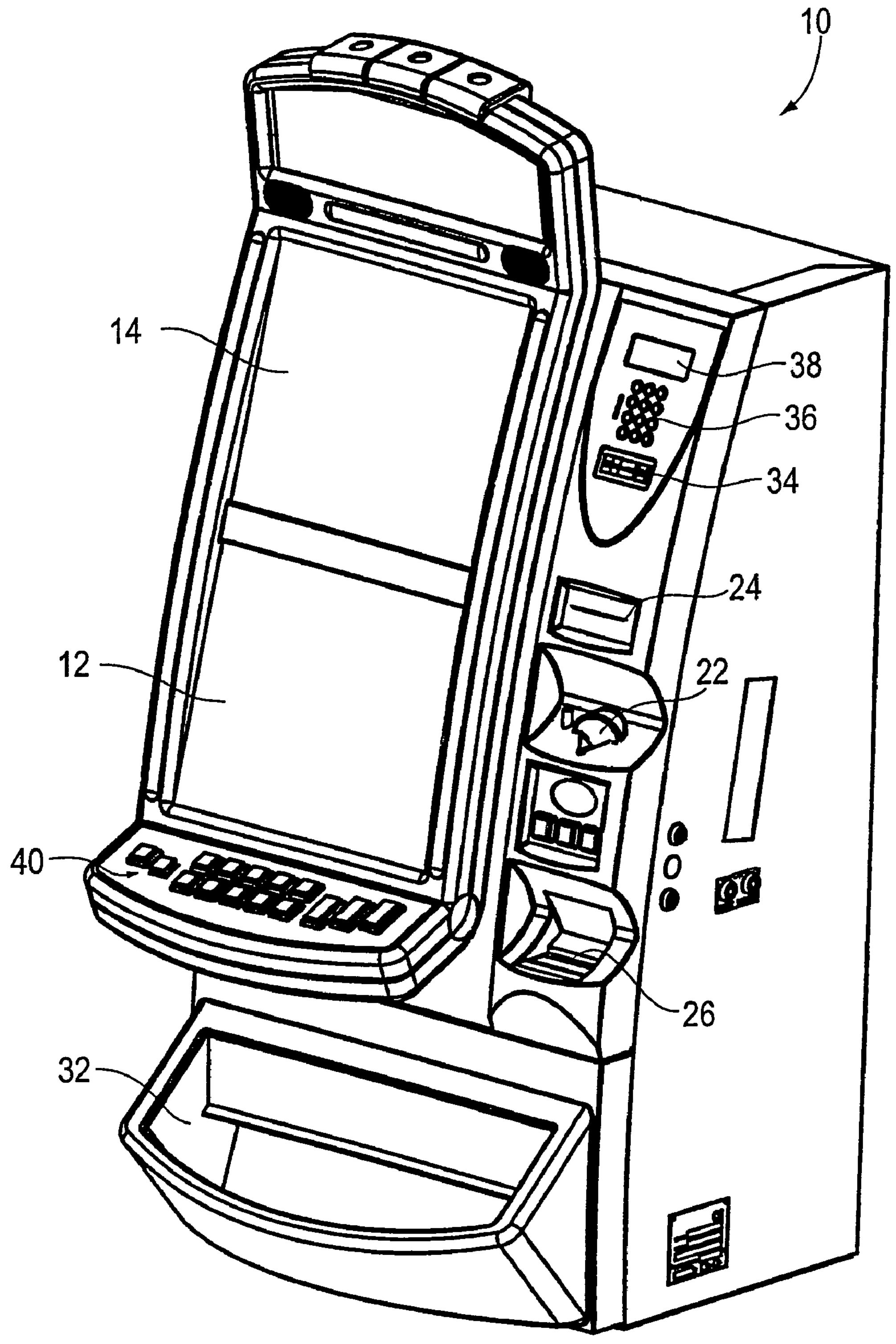
FIG. 1 is a perspective view of one type of video gaming machine that may be programmed to play a game in accordance with the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. Display 12 may be a touch screen for inputting player commands. A second display 14 provides game data or other information in addition to display 12. Display 14 may provide static information, such as an advertisement for the game, the rules of the game, pay tables, pay lines, or other information, or may even display the game itself along with display 12. Alternatively, the area for display 14 may be a display glass for conveying information about the game.

A coin slot 22 accepts coins or tokens in one or more denominations to generate credits within machine 10 for playing games. A slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a play two-ways button, a spin reels button, a maximum bet button, a cash-out button, a display pay lines button, a display payout tables button, select icon buttons, and any other suitable button. Additional buttons may be used with the invention. Buttons 40 may be replaced by a touch screen with virtual buttons, a joystick, a touchpad, or other types of controllers.

Figure 2:
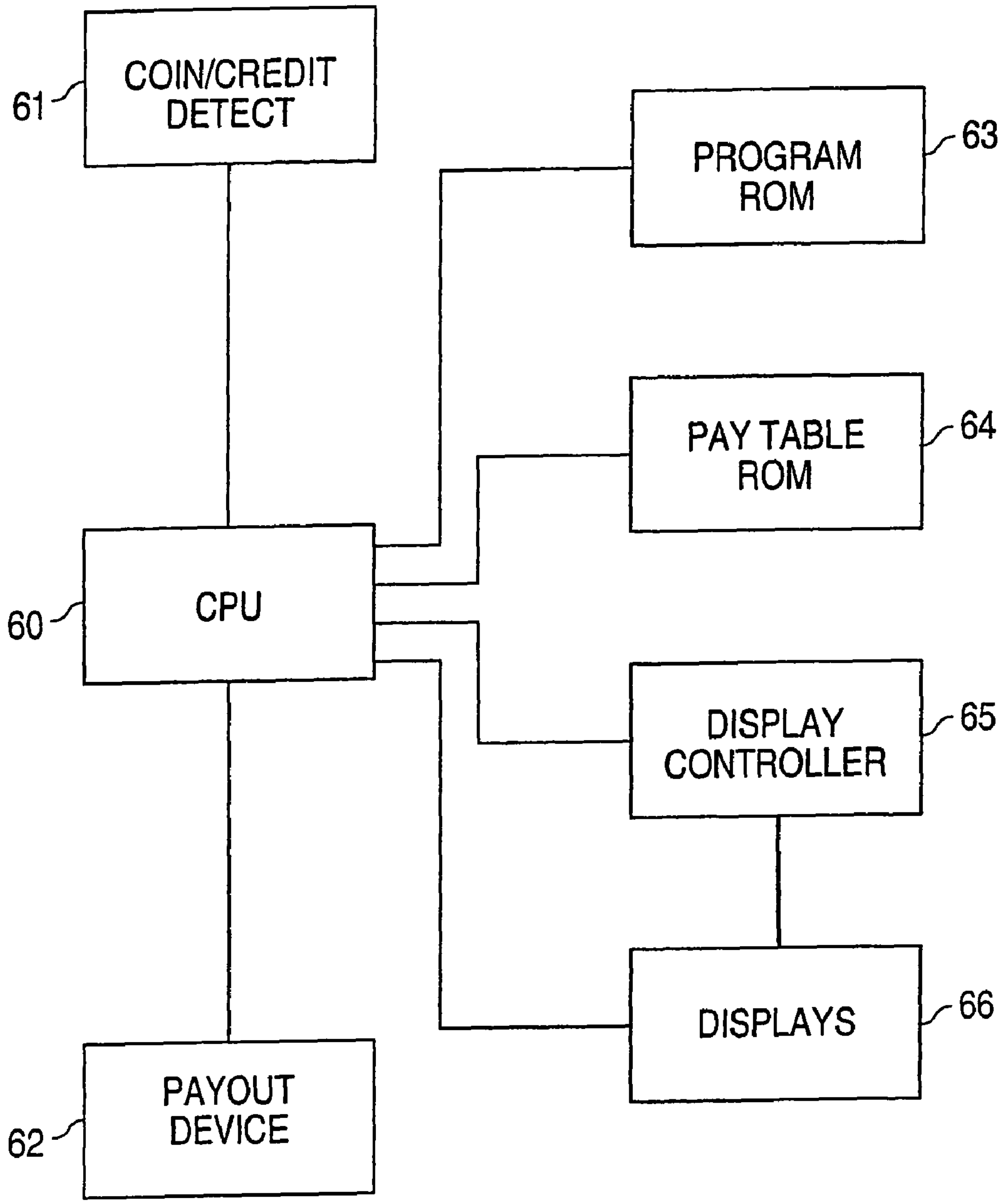
FIG. 2 is a block diagram illustrating various functional units in the machine of FIG. 1.

FIG. 2 illustrates basic circuit blocks in a suitable gaming device. A control unit (CPU 60) runs a gaming program stored in a program ROM 63. A coin/credit detector 61 enables the CPU 60 to initiate a next game. A pay table ROM 64 detects the outcome of the game and identifies awards to be paid to the player. A payout device 62 pays out an award to the player in the form of coins upon termination of the game or upon the player cashing out. A payout may also be in the form of a coded paper ticket, credits on a smart card or magnetic strip card, or in any other form. A display controller 65 receives commands from the CPU 60 and generates signals for the various displays 66. If a display 66 is a touch screen, player commands may be input through the display screen into the CPU 60.

Figures 3, 4, 5, 6, 7:
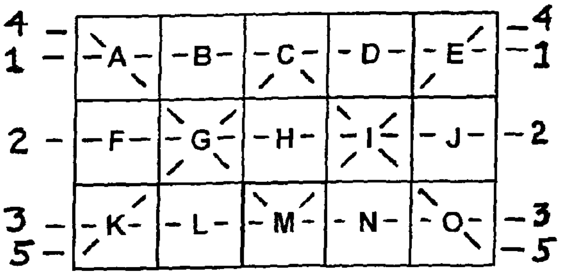
FIG. 3 illustrates a display on the display screen in FIG. 1 of a 5×3 array of randomly selected symbols and five pay lines to be used as an example to illustrate the special features of the game.
FIGS. 4-6 illustrate progressive video screens during three successive games showing how the special symbols carry over to subsequent games and randomly change positions after a game.
FIG. 7 illustrates how a multiplier special symbol can be positioned at the end of a pay line instead of in the array of symbols shown in FIG. 6.

FIG. 3 is one example of a screen display on machine 10 showing five different pay lines 1-5 and an array of symbols A-O. After the player makes a bet and presses a spin button, the symbols are randomly selected by a pseudo-random number generator in the gaming machine and displayed on the display screen.

The gaming machine typically shows, either on its display glass or on a video screen, a pay table identifying the various awards that will be paid upon obtaining certain symbol combinations along activated pay lines or in certain patterns. The player may be required to bet additional credits to activate additional pay lines.

In additional to conventional symbols, the present invention also uses one or more types of special symbols. A special symbol has a special function such as being a wild card (acts as any symbol needed for a winning symbol combination on the same pay line), a multiplier (multiplies an award for combinations on the same pay line as the multiplier), a bonus award (adds a credit amount or a free game if on the same pay line as a winning symbol combination), a high value symbol, or a bonus game symbol (initiates a special bonus game if on the same pay line as a winning symbol combination). Any other special symbols may also be used.

FIG. 4 illustrates the symbols displayed in the 5×3 array after a first game, where one of the displayed symbols is a first special symbol "?1". It will be assumed that the "?" designation means a wild card symbol. The wild card is applied to any symbol combination in the same pay line as the wild card. If the wild card is used in an award-winning symbol combination, the award is paid to the player and the wild card symbol is extinguished after the game. If the wild card cannot be used in the first game to create an award-winning combination of symbols across an activated pay line, then the wild card is carried over into the next game. It will be assumed in the examples of FIGS. 5-7 that the special symbols are not extinguished after a game.

In another embodiment, a special symbol is not automatically extinguished if it is used in an award-winning combination but is carried over to a certain number of subsequent games.

When the player spins the reels for the second game, the special symbol "?1" in FIG. 4 is randomly moved to any other position in the array. The randomly selected position may even be the original position. FIG. 5 illustrates the various symbols displayed on the video screen after the second game. Note how the first special symbol "?1" has randomly moved to a different position and that another special symbol "?2" was randomly selected in the second game. In one embodiment, the player sees the special symbol "?1" image moving to another position while the reels appear to be spinning.

The gaming machine will typically use a pseudo-random number generator to automatically select a position of the special symbol(s).

Assuming the special symbols in FIG. 5 have not been extinguished during the game, the player then initiates a third game, whose outcome is shown in FIG. 6. As seen, the special symbols "?1" and "?2" have randomly changed positions. The third game also randomly selected a ×3 multiplier special symbol. The multiplier is shown next to a conventional symbol. The multiplier may instead be superimposed over any symbol or placed at the end of the pay line, as shown in FIG. 7. Any award for a symbol combination across the same pay line incorporating the multiplier gets multiplied by the multiplier amount.

It is not necessary that a new special symbol appear after each spin. For example, a special symbol first appearing in a game may move around during the next three games without a new special symbol appearing. In the fifth game, a new special symbol may appear, and both special symbols then move around for subsequent games until they are extinguished.

The special symbols (e.g., wild cards) may be on the virtual reel strips, or may appear anywhere in the symbol array only during special games (e.g., bonus games), or may appear randomly during any game.

During any base game or bonus game, the special symbol may move in a random, restricted, or predetermined manner. For example, the special symbol may move only along one reel strip or straight across the reels. Any rule is envisioned. The use of the term random herein means that the movement appears random to the player even though the selection of the position of the special symbol may not be purely random.

In another embodiment, each of the two screens in FIG. 1 displays a different game (e.g., two reel games). If a wild special symbol appears on one screen, it may move to the other screen.

A displayed special symbol can be retained for multiple games based on various criteria, such as until a player wins using the special symbol, for a randomly selected number of games, for a predetermined number of games, for as long as the player continues to win, for a certain time, or based on other criteria. The feature of carrying over special symbols to subsequent games may even be only available upon certain triggering events, such as if the player obtained a special outcome in the main game.

In one embodiment, the special symbol disappears after a single game.

An additional special symbol (e.g., a wild symbol) may appear based on any criteria, such as randomly, or after a predetermined number of games, or after the player has achieved a certain outcome in the main game.

When a wild special symbol moves between games (e.g., when the reels are spinning) and lands on another wild special symbol, the wild may pay double for a win. The double wild may then move together during the next game.

There may even be limits to whether a displayed special symbol makes a position wild. For example, the special symbol can be wild only if a maximum bet is made.

In one embodiment, up to eight special symbols (either all the same or different types) can be carried over to a next game and randomly repositioned for the next game.

Numerous other embodiments are envisioned using these concepts.

One skilled in the art can easily program a pay table ROM to grant the appropriate award to the player when a special symbol is involved in the award.

Having described the invention in detail, those skilled in the art will appreciate that, given the present disclosure, modifications may be made to the invention without departing from the spirit of the inventive concepts described herein. Therefore, it is not intended that scope of the invention be limited to the specific embodiments illustrated and described.

What is claimed is:

1. A gaming method wherein an array of symbols is displayed and an award is granted based on the displayed array of symbols, the method comprising:

displaying on a first display screen of a gaming machine, in a first game, a first array of randomly selected symbols on a first set of virtual reels, the first array including at least one special symbol in a first position in the first array;

granting any award to the player for the first game based upon combinations of symbols across the first set of virtual reels displayed in the first game including combinations of symbols that include the at least one special symbol as part of a combination of symbols;

concurrently displaying on a second display screen of the gaming machine, in a second game, a second array of randomly selected symbols on a second set of virtual reels, the second array of symbols being randomly selected independently of the first array of symbols;

shifting a position of the at least one special symbol in the first array to a second position in the second array on the second display screen, wherein the shifted special symbol is combinable with the randomly selected symbols in the second array to form winning combinations of symbols; and granting any award to the player for the second game based upon combinations of the symbols across the second set of virtual reels displayed in the second game including combinations of symbols that include the at least one special symbol as part of a combination of symbols.

2. The method of claim 1 wherein shifting a position of the at least one special symbol in the first array from the first position to the second position comprises randomly shifting a position of the at least one special symbol from the first position to the second position.

3. The method of claim 1 wherein shifting a position of the at least one special symbol in the first array from the first position to the second position comprises shifting a position of the at least one special symbol in a predetermined manner from the first position to the second position.

4. The method of claim 1 wherein displaying in a first game a first array of randomly selected symbols comprises displaying in the first game the first array of randomly selected symbols appearing on a plurality of virtual reel strips, the at least one special symbol being on at least one reel strip in a fixed position relative to other symbols on the reel strip.

5. The method of claim 1 wherein displaying in a first game a first array of randomly selected symbols comprises displaying in the first game the first array of randomly selected symbols by a gaming machine appearing on a plurality of virtual reel strips, wherein the at least one special symbol is not in a fixed position on a virtual reel strip.

6. The method of claim 1 wherein displaying in a first game a first array of randomly selected symbols by a gaming machine comprises selecting the at least one special symbol to appear in the first array based on a non-random event.

7. The method of claim 1 wherein the at least one special symbol comprises a plurality of special symbols.

8. The method of claim 1 further comprising terminating the use of the at least one special symbol after the at least one special symbol is used in a winning combination of symbols.

9. The method of claim 1 further comprising terminating the use of the at least one special symbol after a predetermined number of games.

10. The method of claim 1 wherein the at least one special symbol has a wild card function.

11. The method of claim 1 wherein the at least one special symbol is a high value symbol.

12. The method of claim 1 wherein the at least one special symbol has a multiplier function.

13. The method of claim 1 wherein the at least one special symbol triggers a bonus game.

14. The method of claim 1 wherein the first array of symbols is a 5×3 array.

15. The method of claim 1 wherein granting an award comprises granting an award based on combinations of symbols across one or more pay lines.

16. The method of claim 1 wherein new special symbols are generated in one or more additional games and are randomly shifted in position during subsequent games.

17. A gaming device comprising:

a first display screen for displaying a first game, the first game displaying a first array of symbols on a first set of virtual reels, certain combinations of symbols across at least one pay line determining an award to a player;

a second display screen for displaying a second game, the second game displaying a second array of symbols on a second set of virtual reels, certain combinations of symbols determining an award to a player; and at least one processor for carrying out the following method:

displaying on the first display screen, in the first game, the first array of randomly selected symbols on the first set of virtual reels, the first array including at least one special symbol in a first position in the first array;

granting any award to the player for the first game based upon combinations of symbols across the first set of virtual reels displayed in the first game including combinations of symbols that include the at least one special symbol as part of a combination of symbols;

concurrently displaying on the second display screen, in the second game, the second array of randomly selected symbols on the second set of virtual reels, the second array of symbols being randomly selected independently of the first array of symbols;

shifting a position of the at least one special symbol in the first array from the first position to a second position in the second array on the second display screen, wherein the at least one shifted special symbol is combinable with the randomly selected symbols in the second array to form winning combinations of symbols; and granting any award to the player for the second game based upon combinations of the symbols across the second set of virtual reels displayed in the second game including combinations of symbols that include the at least one special symbol as part of a combination of symbols.

18. The device of claim 17 wherein shifting a position of the at least one special symbol in the first array from the first position to the second position comprises randomly shifting a position of the at least one special symbol.

19. The device of claim 17 wherein the at least one special symbol comprises a plurality of special symbols.

20. The device of claim 17 further comprising terminating the use of the at least one special symbol after the at least one special symbol is used in a winning combination of symbols.

21. The device of claim 17 wherein the at least one special symbol has a wild card function.

22. The device of claim 17 wherein the at least one special symbol is a high value symbol.

23. The device of claim 17 wherein the at least one special symbol has a multiplier function.

24. The device of claim 17 wherein the at least one special symbol triggers a bonus game.

25. The device of claim 17 wherein the first array of symbols is a 5×3 array.

26. The device of claim 17 wherein granting an award comprises granting an award based on combinations of symbols across one or more pay lines.

27. The device of claim 17 wherein the at least one special symbol is selected at random to be included in the first array.

* * * * *